United States Patent [19]

Lemelson

[11] 4,056,344
[45] Nov. 1, 1977

[54] APPARATUS FOR PRODUCING COMPOSITE EXTRUSIONS

[76] Inventor: Jerome H. Lemelson, 85 Rector St., Metuchen, N.J. 08840

[21] Appl. No.: 319,194

[22] Filed: Dec. 29, 1972

Related U.S. Application Data

[60] Continuation-in-part of Ser. No. 68,724, Sept. 1, 1970, Pat. No. 3,708,253, which is a continuation-in-part of Ser. No. 736,081, June 11, 1968, Pat. No. 3,526,020, which is a division of Ser. No. 142,405, Oct. 2, 1961, Pat. No. 3,422,648.

[51] Int. Cl.² .......................................... B29D 23/04
[52] U.S. Cl. .............................. 425/132; 425/133.1; 425/380; 425/462; 425/467
[58] Field of Search ............... 425/131, 132, 133, 462, 425/466, 97, 104, 287, 325, 326, 463, 467, 133.5, 130, 131.1, 380, 145, 133.1; 264/173, 40.7, 209; 222/145

[56] References Cited

U.S. PATENT DOCUMENTS

| 1,876,256 | 9/1932 | Maynard | 425/95 X |
|---|---|---|---|
| 2,690,592 | 10/1954 | Schanz | 425/104 X |
| 2,803,041 | 8/1957 | Hill et al. | 425/132 X |
| 2,815,033 | 12/1957 | Braunlich | 425/132 X |
| 2,916,792 | 12/1959 | Crook et al. | 425/145 X |
| 3,191,106 | 6/1965 | Baermann | 425/131.1 X |
| 3,218,672 | 11/1965 | Langecker | 425/466 X |
| 3,221,371 | 12/1965 | Stevens | 425/466 X |
| 3,257,482 | 6/1966 | Schechter | 425/817 X |
| 3,354,506 | 11/1967 | Raley | 425/133 |
| 3,422,648 | 1/1969 | Lemelson | 425/466 X |
| 3,451,103 | 6/1969 | Aykanian et al. | 425/131 X |
| 3,550,203 | 12/1970 | Lemelson | 425/132 X |
| 3,674,404 | 7/1972 | Burlis et al. | 425/326 |
| 3,724,985 | 4/1973 | Burlis et al. | 425/132 |

FOREIGN PATENT DOCUMENTS

| 1,296,353 | 5/1969 | Germany | 425/104 |
|---|---|---|---|

Primary Examiner—Ronald J. Shore
Assistant Examiner—Mark Rosenbaum

[57] ABSTRACT

An apparatus and method are provided for producing extrusions of two or more materials such as plastic polymers so as to utilize the characteristics of both materials in a single formation thereof. In one form, flexible and rigid polymers are coextruded through a common die to form selected portions of the length of an extrusion or to form portions of the length of an extrusion composed of one polymer and other portions composed of the same polymer plus a second polymer. Tubing may be formed having portions of its length made completely of a flexible polymer and other portions thereof made of a rigid polymer. The apparatus mahy also form rigid pipe having elastomeric material coated or extruded along selected lengths thereof such that when severed along said lengths, selected pipes may be formed thereof containing end seals formed integral with each length.

9 Claims, 10 Drawing Figures

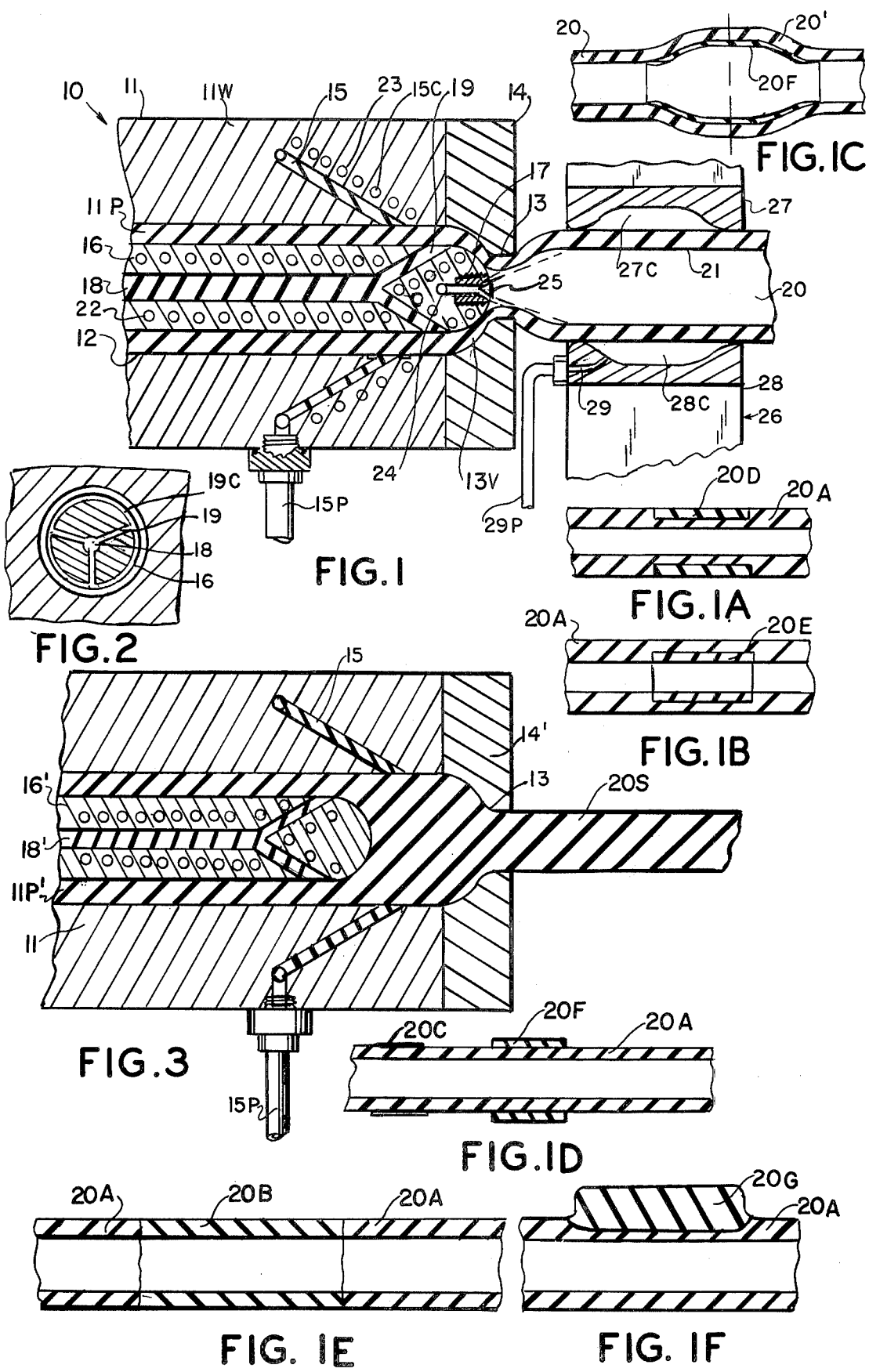

APPARATUS FOR PRODUCING COMPOSITE EXTRUSIONS

RELATED APPLICATIONS

This is a continuation-in-part of application Ser. No. 68,724 filed Sept. 1, 1970, for Extrusion Apparatus and Techniques, which was a continuation-in-part of Ser. No. 736,081 filed June 11, 1968, for Extrusion Techniques and Apparatus, which is a division of Ser. No. 142,405 filed Oct. 2, 1961, now U.S. Pat. No. 3,422,648.

SUMMARY OF THE INVENTION

This invention relates to an apparatus for forming extrusions of two or more materials by coextrusion of two materials, at least one of which is either variably or intermittently flowed during extrusion. The invention is particularly applicable, although not limited to the extrusion of plastic pipe for improving its physical properties and reducing the labor required to install same.

In installing most piping systems from lengths of pipe, assembly is effected by the use of fittings to join the pipe sections together or by jam fitting or welding the ends of the pipes. Fittings are costly, generally require mastics or seals and substantial labor to secure to each section of pipe. This invention is concerning primarily with improvements in machinery for forming pipe sections by extrusion in which seals, sealants and, in certain instances, bonding materials are applied by said machinery directly to the pipe during extrusion so that, when cut to length, the need to post apply same will be eliminated, thus reducing fabrication cost.

It is a primary object of this invention to provide a new and improved apparatus for forming extrusions such as pipe, strips and structural members of two or more materials exhibiting different physical characteristics.

Another object is to provide an apparatus for automatically forming pipe by extrusion, in lengths at the ends of which are provided one or more materials such as seals, sealants, bonding or heat sealing materials and the like.

Another object is to provide an apparatus for forming extrusions, entire portions of which are made of a first plastic while other portions thereof are made of a second plastic, such as rigid plastic interposed between flexible plastic portions which may be more easily deformed by hand to provide bends in the pipe or fasten same to objects.

With the above and other such objects in view as may hereinafter more fully appear, the invention consists of the novel constructions, combinations and arrangements of parts which will be hereinafter more fully described, but it is to be understood that changes, variations and modifications may be resorted to which fall within the scope of the invention as claimed.

In the drawings:

FIG. 1 is a side view, in cross section of the head end of an extrusion machine and external tooling for forming composite pipe and tubing;

FIGS. 1A to 1F are sectional views of the wall structures of different forms of tubing formed by means of apparatus of the type shown in FIG. 1;

FIG. 2 is an end cross sectional view of the extrusion chamber of FIG. 1 taken near the extrusion die;

FIG. 3 is a side view in cross section of the head end of a modified form of the extrusion machine of FIG. 1.

Figure 4:
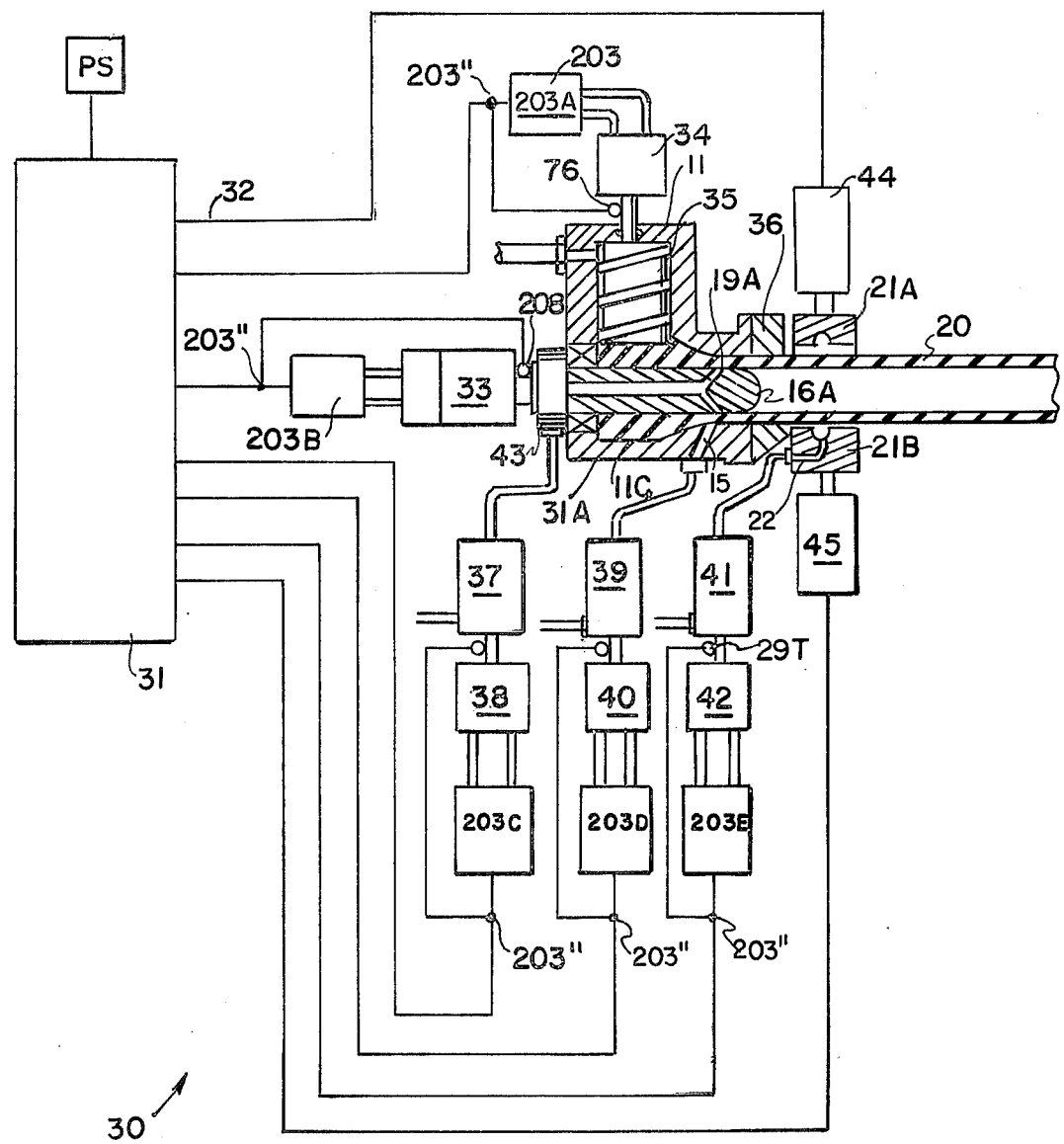
FIG. 4 shows the control means for the extrusion apparatus.

FIGS. 1 and 2 show an extrusion apparatus 10 for forming a tubular extrusion or pipe 20 having one or more coatings on the outside and/or inside surfaces of the pipe which may be variably applied to selected portions of the wall of the extrusion to serve as sealants, adhesives or bendable portions of the pipe. The apparatus 10 comprises an extrusion chamber 11 having an extrusion die 14 terminating a passageway 11P through which a main extrusion material 20A such as a rigid plastic polymer is forced to flow by a conventional powered screw or piston (not shown). A mandrel 16 may be attached to the extrusion screw or die 14 and has its end 17 located in the die opening 13 so as to define an annular volume through which the material 20A may be flowed to form pipe 20.

Extending through the wall 11W of the chamber 11 are a plurality of first passageways 15 to which first passageways a coating material is fed from an inlet pipe 15P. The passageways 15 terminate at a ring shaped cavity 15C in the inside surface of the chamber wall permitting flow of the coating material against the entire outside surface of the tubular extrusion. The passageways 15 may also terminate at a circular cavity in the surface of the die opening 13 so as to permit coating of the material fed through the openings on the outer surface of the tubular shape formed of extrusion material 20A as or just before it attains its final shape. Notation 23 refers to one or more passageways extending close to the passageways 15 for conducting heated fluid to maintain the coating material 15, which may comprise a thermoplastic polymer, in a molten flowable condition during a coating operation.

A longitudinal passageway 18 extends through the center of the mandrel 16 and terminates a supply of a second coating material such as a plastic polymer fed from a screw, piston or accumulator after it has been rendered molten. Terminating passageway 18, near the end 17 of the mandrel 16, are a plurality of branch passageways 19 smaller than 18 and extending radially outwardly therefrom. These passageways may be so spaced as to provide a uniform cylindrical portion or may feed a circular cavity 19C in the outer surface of the mandrel for applying a coating material to the inside surface of the tubular extrusion formed over the mandrel. A helical passageway 22 extends through the mandrel 16 about passageway 18, and like passageway 15, may either contain an electrical resistance heating element or may be used to circulate a heat transfer fluid through the mandrel to maintain the coating material in the passageway 18 and the extrudate in passageway 11P in a fluent condition. Details of the radial passageways 19 and circular cavity 19C in the mandrel are shown in FIG. 2.

A third passageway 24 extends through the mandrel 16 from a source of a third coating material and terminates at the end 17 of the mandrel. Passageway 24 is enlarged and threaded at its end and a spray nozzle 25 is secured therein and operates to spray coating material fed thereto through passageway 24 against the inside surface 21 of the pipe 20 just as or after it leaves the die 14. While the materials fed through passageways 15 and 18 are preferably suitable thermoplastic or thermosetting plastic polymers in molten or liquid condition, the material sprayed from nozzle 24 may comprise such materials as mastics, adhesives which may be heat or solvent activated after they have dried or set in place, microcapsules containing adhesives or sealants in an adhesive liquid carrier or polymers in a solvent base which dry in situ on the surface to which they are applied. The materials fed through passageways 15 and 18 may comprise polymers which are more flexible or rigid than the polymer defining the main extrusion material 20A. The screw, pump, piston or accumulator supplying the described coating materials or valves connected thereto, may be varied in their operation during an extrusion cycle to flow and stop or vary the flow of the respective materials so as to just coat selected areas of the inside and/or outside surfaces of the extrusion with their respective materials or to form selected portions of the wall of the extrusion thereof as illustrated in FIGS. 1A to 1F.

Located beyond the extruder is tooling 26 comprising a pair of dies 27 and 28, which are power operated by respective motors (not shown) to engage and retract from selected semi-cylindrical portions of the extruded tube, serving to outwardly deform or bell the portions of the tube which they engage. The portions of the freshly extruded, soft plastic tube engaged between the dies 27 and 28 are deformed into their respective forming cavities 27C and 28C by vacuum applied through a passageway 29 in die 28 from a vacuum chamber or pump connected to passageway 29 through a pipe 29P.

In FIG. 1C a portion 20' of a tubular extrusion 20, formed by the apparatus of FIG. 1, is outwardly deformed and a coating 20F of mastic or elastomeric material is shown applied to the inside surface of the deformed portion or a part thereof. When portion 20' is severed along its length to form selected lengths of pipe, which are belled at either or both ends, the mastic, sealant or elastomeric material coating the belled portions may be used to effect a fluid pressure seal between the pipe ends when they are assembled together or, if such coating is an adhesive or heat sealable plastic, may be used to secure the ends of the pipe together.

In FIG. 1A, a selected portion 20D of the outer stratum of the wall of a tube formed mainly of a first material 20A, is formed of a material other than that of which the main portion is formed. If 20A is formed of a rigid polymer, material 20D may comprise a more flexible polymer to permit bending the tube or to serve as a seal. If 20A is a flexible polymer, material 20D may comprise a more rigid polymer for supporting the extrusion along the length to which it is applied or for supporting an attachment such as a fitting.

FIG. 1B shows the extruded tube having a portion 20E of the inner stratum of the wall thereof formed of material coextruded with the main portion 20A through passageways 19 to the die cavity 19C in the mandrel so as to provide a substantially cylindrical formation of the tube wall, which may be flexible or more rigid than the polymer forming the remaining wall portion.

In FIG. 1D a coating 20C is applied to a selected portion of the exterior surface of the tube 20A by external tooling or spray means located beyond the die 14. A cylindrical formation 20F is molded against the outer surface of tube 20A by tooling similar to tool 26, which clamping engages selected portions of the extrusion 20A and injects molding material into the cavity formed by tool cavities 27C and 28C. It is noted that tooling 26 may be movable along a track to move at the same speed as the extrusion after it engages same and performs thereon as described.

The apparatus of FIGS. 1 and 2 or modified forms thereof may also be operated to provide extrusions, such as tubes, having selected portions which are entirely formed of a first material, such as a rigid polymer, and other portions interposed between the rigid polymer portions, which other portions are entirely formed of a flexible polymer such as rigid and flexible polyvinyl chlorides, high and low density polyethylenes or any combination of compatible polymers. FIG. 1E shows such a structure in which portions 20B of flexible polymer is interposed between and has the same tubular shape as portions 20A of a rigid polymer.

In FIG. 1F, an extruded tube formed by a modified form of the apparatus of FIGS. 1 and 2 has its major wall portion 20A made of a first rigid or flexible polymer and has one or more fin-like protruding portions formed integral therewith along one or more selected portions of the tube. The protrusions 20G may be more rigid or more flexible than the main portion 20A of the extrusion, may be of any suitable shape and may serve to retain a fitting, valve or joint to the extrusion or to hold the extrusion by fastening it to a support.

In FIG. 3 the apparatus of FIG. 1 has been modified wherein the mandrel 16' is retracted sufficiently from the die opening 13' to permit a solid extrusion 20S to be formed. This and combined therein so as to form solid extrusions of two or more materials one of which may extend inside the other such as that which is introduced through passageway 18' in the mandrel while another material may be intermittently flowed through passageways 15 to either selectively coat or form selected strata portions of the extrusion. The extrusion materials may be flowed to the die 14' from the main chamber or passageway 11P', through either or both the chamber wall and extrusion die or to external tooling which engages the extrusion as described to form new types of extrusions which are either completely or partially composed of different materials along selected lengths of the extrusion so as to utilize the properties of each material for improving the physical characteristics of the extrusion to simplify its application and use. It is also noted that one or more of the extrusion materials introduced into the extrusion chambers, dies or external tooling described, may comprise a polymer with a blowing agent, causing it to expand into a cellular formation beyond the extrusion die so that the portions of the extrusion 20S formed thereof, are either flexible or rigid cellular plastic.

It is noted that the extrusion apparatus shown in FIGS. 1, 2 and 3 may also be utilized as shown or in modified forms thereof, to form composite extrusions by selective coextrusion and/or selectively coating materials other than polymers or by employing one or more polymers together with metal and ceramic materials. High temperature polymers and/or ceramic materials may be selectively coated on metal extrusions such as tubing immediately as or after they are formed.

It is also noted that the pumps, extrusion or feed screws, pistons or other devices which are employed to cause flow of the described extrusion and coating materials may be intermittently or variably controlled during extrusion by signals generated by a record playback unit, computer or multi-circuit timer.

In FIG. 4 is shown an apparatus of the type described including an automatic control means for controlling the flow of the described one or more materials to the extrusion chamber, chamber or die passageways, mandrel passageways for flow coating or forming the inside surface of the tubular extrusion or entire portions thereof as described, mandrel passageway for spray coating the entire portion or selected portions of the inside surface of the tubular extrusion and the described externally located applicator. Thus the apparatus shown in FIG. 4 may be employed to produce a variety of new types of tubular extrusions which may be selectively internally and/or externally coated with sealants, adhesives, elastomeric materials, hard surfacing materials, anti-seizing and anti-friction materials. While the apparatus described has been defined as primarily plastic or polymeric extrusion apparatus, it is noted that apparatus of the type which has been described may be modified in accordance with known configurations for producing and selectively coating the inside surface of pipe and tubing produced by extruding metal such as aluminum, copper, magnesium and other metals as well as ceramic materials, with suitable such as polymers or other materials which will not degrade or vaporize at the temperature of the surface of the tubing to which they are applied. By extending the mandrel of FIG. 1 well beyond the end of the die and suitably externally and/or internally cooling a hot metal extrusion by flowing heat transfer fluid thereagainst from external spray heads and/or internally through the mandrel, a variety of lower temperature softened thermoplastic polymers or conventional thermosetting resins may be applied to either the entire or selected portions of the inside surface of the freshly formed tubular extrusion.

The apparatus 30 of FIG. 4 includes an extrusion machine 11 having an extrusion chamber 11C through which a first extrusion material is forced to a die 36 to form a tubular extrusion 20 as an extrusion screw 35 is power rotated by a motor 34. A mandrel 16A is disposed within the opening in die 36 to define the inside surface of the tubular extrusion and contains passageways therein for flowing one or more materials to either coat the inside surface of the tubular extrusions and/or to form portions of the wall thereof as shown in FIGS. 1A to 1E. While the passageways 19A are shown as extending radially outwardly from a central passageway in the mandrel to function in a similar manner to passageways 19 of FIG. 1, they may comprise or include a passageway such as passageway 24 of FIG. 1 for expelling a fluid from the end of the mandrel as a spray or flow operable to coat selected portions of the inside surface of the tubular extrusion by the selected operation of a pump or valve as will be described. Similarly, a heat transfer fluid or second coating fluid may be continuously or intermittently flowed through such a passageway as 24 in a controlled manner.

In FIG. 4, a controlled motor 33 is shown with its output shaft 34 connected to the rear end of the mandrel which protrudes from the rear wall of the extrusion chamber and may be controlled in its operation to vary the longitudinal location of the mandrel in the extrusion die for varying the wall thickness and/or diameter of the tubular extrusion, as set forth in parent patent Re. Nos. 25,570 and 3,422,648. By suitably shaping the mandrel and die and controlling its longitudinal movement within the die, expanded or belled portions of the extruded tube may be provided as shown in FIG. 1C.

External tooling for operating on selected portions of the extrusion or for coating same is shown in FIG. 4 as comprising respective fluid motors or lineal motor electrical actuators denoted 44 and 45 which respectively move dies 21A and 21B into and out of engagement with the tutular extrusion after it has passed from the extrusion die 36 so as to effect predetermined variations in the exterior surface of the extrusion as described.

A first pump or screw injector 37 is shown having its output line connected to a coupling 43 at the rear end of the extrusion chamber for flowing a first coating or extrusion material to the interior passageway 18 of mandrel 16A which extends to branch passageways 19 as illustrated in FIG. 1 for either coating the interior surface of the tubular extrusion 20 which is made of material forced over the mandrel from the extrusion chamber, or for forming part of or all of the extrusion thereof. The pump or injector 37 is operated by a variable drive motor arrangement 38. Similarly, pumps or injectors 39 and 41 are driven by respective speed variable motor means 40 and 42 to flow respective extrusion or coating materials to the passageways 15 in the die or chamber wall and the passageways 22 in the external tooling as shown in FIGS. 1 and 2.

All of the described motors or servo devices denoted 33, 34, 37, 39, 41, 44 and 45 are controlled in their operation by signals generated by a command signal generator or a computer 31 which, in its simplest form, may comprise a card reader or endless loop multiple channel magnetic tape recorder capable of generating on the plural outputs 32 thereof, signals which not only vary in their characteristics with time, but which are also predeterminately varied with respect to each other and are operable to predeterminately variably control all of the servos described with the exception of the actuators 44 and 45 which are merely caused to engage and disengage the outer surface of the extrusion.

It is noted that each of the drive motor arrangements denoted 33, 34, 37, 39 and 41 are respectively controlled by the respective closed loop control circuit arrangement which control arrangements are denoted by the general notation 203 and subscript letter notations A–E. For a description of a typical closed loop control arrangement operative in response to variable analog signals generated from a recorder such as the unit denoted 31 in FIG. 3, reference is made to parent application Serial No. 68,724 and parent U.S. Pat. Nos. 3,422,648 and 3,002,615 wherein closed loop control systems illustrated in detail corresponding to each of those shown in FIG. 3 of the instant case. Each of the control systems 203 of FIG. 3 includes an electric stroker which receives an error signal from a comparator 203" the input of which comparator is a command signal generated from the computer or command signal generator 31 and the second signal is generated by a variable potentiometer 208 the wiper arm of which is operatively coupled to the output shaft of the motor being controlled. The error or difference signal generated on the output of the comparator 203" is fed to control the electric stroker of the control system 203 which in turn, controls the operation of a hydraulic stroker controlling a hydraulic pump. In control of mandrel displacement motor 33, the hydraulic pump predeterminately determines the degree of forward or reverse movement of the output shaft of the motor thus predeterminately varying the location of the mandrel in the extrusion die. Control of the motors 34, 38, 40 and 42 is effected by controlling the variable displacement pumps of the respective systems. Also by controlling respectively control valve settings for varying the speed of operation of the pump motors which drive the pumps forcing extrusion or coating materials to the passageways in the mandrel, flow of described extrusion or coating materials may be controlled.

As an alternative to the generation of variable amplitude or frequency command signals, it is noted that pumps 37, 39 and 41 may merely be operated by respective motors which are energized and de-energized at different times during extrusion by pulse or constant amplitude electrical signals generated on respective of the outputs 32 of the command signal generator 31 so as to flow or to not flow the respective extrusion or coating materials to the passageways described. Accordingly, the pumps 37, 39 and 41 may be replaced by respective plastic or coating material accumulators, each of which is fed from a source of material and releases its charge in accordance with the operation of an output solenoid valve in the line leading to the mandrel, die or external tooling passageway.

Thus it is seen that by predeterminately generating control signals on the outputs 32 of the command signal generator 31 which, in its simplest form may comprise a multicircuit timer, extrusions may be formed which are composed of different materials forming predetermined portions of the lengths of the extrusions or forming part of predetermined portions of the extrusion, which material or materials may also vary in shape and quantity along such predetermined extrusion lengths.

In yet another form of the extrusion producible by means of the apparatus of FIG. 3, it is noted that coating materials may be disposed along selected portions of the outside and/or inside surfaces of the tubular extrusion and that such tubular extrusion may either comprise, a parison from which a blow molded object such as a container is produced wherein the parison varies in composition or has coating material varying along its length. Blow molded objects or extrusions may thus be produced which are made of rigid and flexible polymers. For example, certain types of containers for liquids or gases may be produced in which neck, handle or other portions thereof are made of a rigid polymer while other portions of the molding or extrusion are made of a flexible polymer. In another structure, the coating may be selectively provided on the inside of the extrusion, which coating is omitted from a portion of the extrusion or parison which is to be pinch sealed together wherein the coating material would ordinarily prevent a suitable seal to be effected. Hollow objects or tubes may be extruded or blow molded which contain portions thereof made of a rigid polymer and other portions made of a flexible polymer or elastomeric material.

In FIG. 3, the closed loop control systems which include components 203C, 203D and 203E for controlling the respective pumps 37, 39 and 41 operate to control the speed of the respective pump motors 38, 40 and 42 by means of respective feedback tachometers dented 9T which are driven by the output shafts of said motors and supplyelectrical signals to the comparators 230" forming respective portions of the closed loop systems and which receive speed command signals from respective outputs of the command signal generator 31.

Although not illustrated in FIG. 4, a further control loop or switch may be provided to operate a solenoid or pump for coating material to be selectively sprayed against selected portions of the inside surface of the tubular extrusion, as admitted, for example from a spray nozzle such as nozzle 25 shown in FIG. 1 mounted at the end of the mandrel which defines the inside surface of the extruded tube. Such control loop or switch may also be controlled in its operation to control the spraying action by a signal generated by the multi-circuit controller or computer 31 so as to deposit material along selected lengths of the tube wall.

In a particular mode of operation of the apparatus 30 of FIG. 4 it is noted that any of the described extrusion or coating materials may be flowed continuously through their respective passageways while one or more of the other extrusion or coating materials is intermittently flowed. A coating may thus be continuously applied to either or both the inside and outside walls of the extrusion while the other wall or interior portions of the tube wall may be varied in composition.

It is noted that the apparatus described may be modified in a number of additional ways to improve the operation thereof and provide new products. For example, the following variations are noted:

I. Tooling which is either a modified form of that illustrated in the drawings or is additionally supplied beyond the extrusion die, may be utilized to automatically sever predetermined portions of the deformed extrusion. For example, the tools 29 and 29' of FIG. 1 and 2 may be operative to form belled portions such as E' of the extrusion in cooperation with mandrel movement as described and to simultaneously sever lengths of the extrusion either through the belled portions E' of the wall of the tubing or immediately in front of or to the rear thereof.

Tooling, such as the type illustrated in FIGS. 3-6, may be shaped not only to deform the extrusion by belling it as illustrated, but also to sever the belled portions of the tooling as rotated or sever the extrusion immediately in front or to the rear of the belled portions. For example, the provision of a sharp edge on the tool 37 of FIGS. 3 and 4, the tool 48 of FIG. 5 or the tool 48' of FIG. 5' may be utilized to spin-cut the extrusion so as to sever the length downstream thereof from the remainder of the extrusion as the mandrel is rotated. An auxiliary tool cooperating either upstream or downstream of the tools 37, 48 or 48' may also be utilized and operated in such a manner as to sever the extrusion while it is in motion or stationary, as described. The belling may also be effected while the extrusion is stationary as a result of stopping the extrusion procedure for a time sufficient to effect such operation.

II. If the tooling 37, 48 or 48' is projected outwardly against the extrusion while the mandrels 35 and 45 are controllably rotated and while the extrusions are moved in a predetermined speed through the die a helical bead-like formation may be provided in the extrusion wall which may be utilized to change the physical characteristics of the extrusion. For example, if the bead-like formation is one in which the bead is heavy walled at its center and necked down where it joins the next spiral formation therof, the tubing so formed may be flexed or bent without collapsing.

III. The tooling arrangement illustrated in FIG. 5 and employs an elongated mandrel 45 with a power operated device 47' at the end thereof operative to project and retract a cutting tool, may be utilized to variably machine elongated tubes and rods by controlling the rotation of the mandrel simultaneously as the projectable tool is controlled. Such a tool may also be used to variably machine holes in work in addition to the inside surface of the wall of a tube, such as an extrusion or other shape.

IV. By controlling the longitudinal position of a mandrel such as mandrel 19 of FIG. 1 to vary the clearance between the wall of the die and the end portion of the wall of the mandrel, the wall thickness of the tubular extrusion may be predeterminately varied to add material, for example, immediately adjacent to or at the belled portion of the tubular extrusion to improve the physical characteristics of said portion. This operation may be effected concurrently with variations in the operation of the means feeding extrusion material to the die so as to increase the rate of flow of material when the annular die opening is increased and decrease said rate when the annular opening is decreased.

V. In addition to cutting or displacing material of the wall of an extrusion such as a tube or pipe to form or machine conventional threads on the inside surface of the extrusion as described, modified forms of the invention may be utilized to form or cut threads in the external surface of portions of an extrusion as it is moved from the extrusion die or while the extrusion is stopped as described so that when the extrusion is severed thereafter along or adjacent to the threads, either or both the severed portions will contain external threading for attaching couplings, valves and other fittings thereto or for securing lengths of said tubing together. In other words, both external tooling which is a modified form of that shown in FIGS. 1 or 9 and internal mandrel mounted tooling as provided in the other drawings, may be applied simultaneously or in sequence to different portions of an extrusion to providing lengths of tube, when severed from the extrusion, which are internally threaded at one end and externally threaded at the other end with the threads on the exterior of one tube section at one end thereof operative to screw assemble with the internal threads of one end of another lengths of said tubing.

The threading tooling may be operative to provide tapered pipe threads or constant diameter threads and additional means as defined in the drawings or modified forms thereof may be operative to apply sealant or elastomeric material to the threads so formed as or immediately after they are formed. The external tooling described above may comprise aligned dies operative to be compressed against and thermally deformed the exterior surface of selected portions of the tubing with threads by operating on the softened plastic material before it has completely solidified and is yet in a condition to be "molded" to shape or by applying heat thereto to soften same as through said dies. Such threading tooling may also contain a rotating cutter or roll deforming tool operative to spin against the extrusion immediately after it leaves the extrusion die and is still aligned with the protruding mandrel so as to effect the deformation thereof.

VI. Modified forms of the external tooling defined in V. above may be operative to cooperate with the mandrel protruding from the end of the die in forming spiralling convolutions in the wall of the tubular extrusion or in otherwise forming the freshly formed tube as it extrudes to vary its shape along its length.

VII. The described means for applying a sealant such as an elastomer or other resilient polymer to selected portions of an extrusion may also be modified to coat selected portions of the inside and/or outside surface of an extrusion in accordance with particular requirements for selected lengths of the tubular extrusion. Such selective coating material may comprise a sealant such as an elastomer, adhesive, a polymer other than that forming the main extrusion, an abrasion resistant material or polymer applied to portions of the extrusion to be bent or otherwise formed and subject to greater erosive forces, a decorative material or other coating material.

VIII. Concurrently with the application of an elastomeric material or more flexible resin to a portion of the extrusion, the mandrel or external tooling may be operated to decrease or change the shape of the wall of the main extrusion which is adjacent to the applied sealant to provide a seat or recepticle for at least part of the resin.

IX. Utilizing modified forms of the invention provided herein, both flexible and rigid or lower durometer resins may be simultaneously or sequentially extruded to define variable portions of the cross sections of an extrusion or to provide an extrusion having entire portions of its length made of a rigid resin separated from portions of the length of said extrusion made of a flexible resin. Variations may include one resin being more rigid than the other to permit the tube to be easily flexed or bent along those portions thereof which are made of said more flexible resin. By program controlling the valving means for admitting each resin to the extrusion die and/or the means for feeding said resins thereto, selected portions of the length of an extrusion may be made more flexible than other portions in accordance with bending or installation requirements. Both flexible and rigid resins may also be varied in amounts along portions of a constant cross section extrusion or an extrusion which predeterminately varies with length and content of said multiple resins. Such resins as high and medium or low density polyethylene, polybutadiene styrene and impact polystyrene modified with rubber, rigid polyvinyl chloride and plasticized polyvinyl chloride, and others may be combined to provide such composite extrusions as proposed above.

X. The tooling illustrated in the drawings may be oscillated at frequencies of a cycle or more per second to provide ripples in the inside surface of a tubular extrusion for the purpose of improving the flow of fluid through the tubing.

In yet another form of the invention, it is noted that the apparatus described and illustrated may be utilized to produce composite extrusions which are composed of three or more layers of of the same or different extrudates to form sandwich-like formations of solid or hollow tubular extrusions. For example, the apparatus 10 of FIGS. 1 and 2 may be utilized, as illustrated or modified, to produce tubular extrusions, the walls of which are composed of three or more separate layers of materials, one formed as a circumscribing tubular or cylindrical formation about the other and each exhibiting a different characteristic than the others. In a particular arrangement, a first polymer containing a blowing or foaming agent may be introduced into the passageway 11P between the mandrel 16 and extrusion chamber wall 11W which becomes a cellular plastic upon leaving the extrusion die. A non-foaming, non-porous polymer may be introduced through the passageways 15 in the extrusion chamber or die and made to form a coating or jacket about the entire outside surface of the tubular formation of foamed, cellular plastic introduced into the main extrusion chamber 11P. A second non-porous and non-foaming polymer may be introduced through the passageways 19 in the mandrel 16 and/or sprayed from the nozzle 25 at the end of the mandrel and made to coat or form a stratum or tubular formation inside the foamed plastic material forming the interlayer or stratum of the material flowed through the main chamber 11P. The finished tube or pipe may thus mave a composite wall, the greatest thickness of which is composed of the intermediary cellular plastic layer which is coated or covered on both its inside and outside surfaces with respective layers of plastic which is non-porous and non-cellular.

Such composite pipe structures have a number of advantages over conventional plastic pipe made of a single polymer. The interlayer of foamed plastic may not only provide substantial support for the pipe wall permitting large diameter pipe to be produced at low cost but it may also serve as a heat insulating material. The cellular interlayer may be made of a rigid plastic foam material for large diameter pipe, say 6 to 24 inch or more in diameter or flexible plastic foam where flexibility is desired with heat insulation and self supporting characteristics, say in the range of 1 to 6 inch diameter pipe.

Typical combinations of resins which may be utilized for such composite tubular plastic extrusions include rigid cellular polyvinyl chloride foamed plastic for the intermediate layer formed of material introduced through chamber passageway 11P, and rigid non-cellular polyvinyl chloride introduced thru passageways 15 and 19 and defining coatings or shells both inside and outside the cellular plastic stratum of the pipe wall. The three layers may also be composed of other rigid polymers such as polyurethane polymers, high density polyethylene or polypropylene with the center layer made of cellular, foamed versions of the same or different polymers as the outer and inner non-cellular layers. The three layers may also be made of flexible polymers such as plasticized polyvinyl chloride, medium density polyethylene or other flexible resins. The three layers may also be made of combinations of flexible and rigid resins of the types described above with the cellular plastic layer being flexible or rigid and either or both the inner and outer covering layers being flexible or rigid in nature. The cellular plastic layer will, of course be greater in thickness than either of the inside and outside non-cellular plastic covering layers, perhaps from two to ten times or more in thickness than either or both said covering layers.

In a modified form of the above described three layer pipe construction, it is noted that the extrusion die and/or mandrel of FIGS. 1 and 2 may be modified to permit either or both the materials introduced through the passageways 15 and 19 or modified forms thereof to form rib-like formations extending radially between said inner and outer non-cellular layers to provide radial support for the tubing or pipe so formed. Such a composite walled pipe may also be belled at selected portions of its length by the means illustrated in FIG. 1.

In yet another form, rigid, reinforcing filaments or structural formations of non-cellular plastic may be introduced into the chamber volume 11P from either or both the mandrel and passageways in the extrusion chamber wall or die and made to flow through the central portion of the plastic flowing therein prior to or as it foams into a cellular mass so as to extend longitudinally through the cellular layer for reinforcing same and stiffening the extrusion. Such stiffening filaments or formations may be interconnected or separate from each other. They may also be formed as one or more net-like formations extending through the foamed plastic layer.

I claim:

1. An apparatus for forming an integrally molded article of at least two different thermoplastic materials comprising:

a die to define a predetermined shaped article, a first variably controllable means operatively associated with said die for introducing a first melt material into said die, a second variably controllable means operatively associated with said die for introducing a second melt material into said die whereby said first and second materials occupy selected portions of said shaped article defined by said die to form a composite molded article of said materials, and a control means operatively associated with first and second variably control means for variably controlling said first and second variably controllable means for predeterminately activating said first and second means so as to variably control the introduction of said first and second melt materials into said die during a forming operation whereby the formed thermoplastic article will embody the attributes and characteristics of the respective first and second materials.

2. An apparatus in accordance with claim 1, said variable control means operatively associated with said first and second variably control means being operable to cyclically vary a number of times during the forming operation and to repeatedly form substantially the same variations in the composition of the article at selected portions of said article.

3. An apparatus in accordance with claim 1 wherein said die is shaped for extruding a tube and said flow varying means is operable to form tubing having its wall composed of said first and second materials which predeterminately vary along the length of the tube.

4. An apparatus in accordance with claim 3 said first variably controllable means being operable to provide variations in the composition of the outer stratum of the extruded tubing along its length.

5. An apparatus in accordance with claim 3, said second variably controllable means being operable to provide variations in the composition of the inner stratum of the extruded tubing wall along its length.

6. An apparatus in accordance with claim 3 wherein said first and second means is operable to alternately flow a first of said materials to said die while preventing the flow of the second material to said die and to thereafter cause the flow of said second material while preventing the flow of said first material so as to form an extrusion which is composed of alternate attached lengths of said respective two materials with the portions of each material defining the complete cross-section of the extrusion.

7. An apparatus in accordance with claim 3 wherein said extrusion die is operable to form tubing and said first and second means being operable to form a tubing having cross sectional portions composed entirely of one of said materials and interposed between other cross sectional portions composed of both said materials.

8. An extrusion apparatus comprising an extruder having a die containing an opening, a mandrel disposed in said die opening, a first means associated with said die for variably forcing a first extrusion material through said die opening and over said mandrel to form a tubular extrusion thereof a second means operatively associated with said die for variably forcing the flow of a second extrusion material and causing said second material to combine with said first extrusion material along selected portions of the length of said tubular extrusion formed of said first material and to form tubular formations of said second extrusion material along selected portions of the extrusion so as to define a composite tubular extrusion formed primarily of said first extrusion material and having circumscribing portions of its wall composed of said second extrusion material at predetermined intervals along its length, and control means operatively associated with said first and second means for variably controlling the flow of said first and second extrusion materials to said die.

9. An extrusion apparatus in accordance with claim 8 wherein said variable forcing control means for said first and second extrusion material to said die includes a program controller.

* * * * *